United States Patent
Janneteau et al.

(10) Patent No.: US 8,942,241 B2
(45) Date of Patent: Jan. 27, 2015

(54) METHOD FOR EQUALIZING THE SIZE OF DATA PACKETS BY BLOCKS OF A MULTIMEDIA STREAM

(75) Inventors: Christophe Janneteau, Chaudon (FR); Pierre Roux, Jouy en Josas (FR); Mounir Kellil, Massy (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 147 days.

(21) Appl. No.: 13/390,589

(22) PCT Filed: Aug. 26, 2010

(86) PCT No.: PCT/EP2010/062505
§ 371 (c)(1),
(2), (4) Date: Feb. 15, 2012

(87) PCT Pub. No.: WO2011/023776
PCT Pub. Date: Mar. 3, 2011

(65) Prior Publication Data
US 2012/0140779 A1    Jun. 7, 2012

(30) Foreign Application Priority Data

Aug. 28, 2009   (FR) .................................. 09 55876

(51) Int. Cl.
*H04L 12/28*   (2006.01)
*H04N 7/66*    (2006.01)
(Continued)

(52) U.S. Cl.
CPC ............... *H04N 7/66* (2013.01); *H04L 1/0041* (2013.01); *H04L 1/009* (2013.01); *H04N 21/235* (2013.01);
(Continued)

(58) Field of Classification Search
USPC ...................... 370/475, 389, 395.1
See application file for complete search history.

(56) References Cited

U.S. PATENT DOCUMENTS 8,320,364 B2 * 11/2012 Wu et al. ..................... 370/352
2002/0146074 A1 * 10/2002 Ariel et al. ............... 375/240.27
(Continued)

FOREIGN PATENT DOCUMENTS

WO    WO 2006/038095 A1    4/2006

OTHER PUBLICATIONS

International Search Report issued Sep. 24, 2010, in PCT/EP2010/062505.

(Continued)

*Primary Examiner* — Hassan Kizou
*Assistant Examiner* — Deepa Belur
(74) *Attorney, Agent, or Firm* — Oblon, Spivak, McClelland, Maier & Neustadt, L.L.P.

(57) ABSTRACT

A method equalizing sizes of data packets by blocks of a multimedia stream including a succession of data packets of variable sizes. The method includes: storing a group of N (a predefined integer) data packets in a buffer memory; computing average size Tm of a packet from the different sizes of the N packets; generating a base stream including N data packets to be transmitted, wherein each has a size equal either to the rounded-down integer part $\lceil Tm \rceil$, or to the rounded-up integer part $\lfloor Tm \rfloor$ of the average size, and at least one additional stream including N redundant data packets computed from the base stream packets, having same size as the base stream packets, and intended to enable a receiver to restore any lost packets if the loss rate is greater than a predefined threshold; and transmitting the base stream and the additional stream(s) to the receivers.

8 Claims, 8 Drawing Sheets

(51) Int. Cl.
*H04L 1/00* (2006.01)
*H04N 21/235* (2011.01)
*H04N 21/2381* (2011.01)
*H04N 21/2389* (2011.01)
*H04N 21/435* (2011.01)
*H04N 21/4385* (2011.01)
*H04N 21/63* (2011.01)
*H04N 21/6437* (2011.01)

(52) U.S. Cl.
CPC ....... *H04N 21/2381* (2013.01); *H04N 21/2389* (2013.01); *H04N 21/435* (2013.01); *H04N 21/4385* (2013.01); *H04N 21/631* (2013.01); *H04N 21/6437* (2013.01); *H04L 2001/0093* (2013.01)
USPC .................. 370/395.1; 370/475; 370/389

(56) References Cited

U.S. PATENT DOCUMENTS

| | | |
|---|---|---|
| 2003/0226092 A1 | 12/2003 | Kim et al. |
| 2006/0075321 A1* | 4/2006 | Vedantham et al. .......... 714/776 |
| 2006/0077890 A1* | 4/2006 | Suryavanshi et al. ........ 370/216 |
| 2007/0076680 A1* | 4/2007 | Amram et al. ................ 370/349 |
| 2007/0147314 A1* | 6/2007 | Taleb et al. ................... 370/338 |
| 2008/0040648 A1* | 2/2008 | Li et al. ........................ 714/776 |
| 2008/0279159 A1* | 11/2008 | Kumar et al. ................. 370/338 |
| 2009/0204874 A9* | 8/2009 | Lakkis .......................... 714/783 |
| 2009/0300469 A1* | 12/2009 | Rajakarunanayake ....... 714/776 |
| 2010/0220644 A1* | 9/2010 | Reznik et al. ................. 370/315 |
| 2012/0042227 A1* | 2/2012 | Watson et al. ................ 714/776 |
| 2012/0096508 A1* | 4/2012 | Kim et al. ..................... 725/118 |
| 2012/0170583 A1* | 7/2012 | Miyazaki et al. ............. 370/392 |
| 2012/0201123 A1* | 8/2012 | Pegrum et al. ................ 370/218 |
| 2013/0067295 A1* | 3/2013 | Luby et al. .................... 714/776 |
| 2013/0148631 A1* | 6/2013 | Kim et al. ..................... 370/331 |

OTHER PUBLICATIONS

"Universal Mobile Telecommunications System (UMTS); LTE; Multimedia Broadcast/Multicast Service (MBMS); Protocols and codecs", 3GPP TS, Technical Specification, European Telecommunications Standards Institute, ETSI TS 126 346, Version 8.3.0, Release 8, XP 014044648, Jun. 2009, 139 pages.

M. Watson, "Basic Forward Error Correction (FEC) Schemes", Network Working Group, Standards Track, XP015065498, Mar. 2009, pp. 1-19.

U.S. Appl. No. 14/379,374, filed Aug. 18, 2014, Janneteau, et al.

* cited by examiner

METHOD FOR EQUALIZING THE SIZE OF DATA PACKETS BY BLOCKS OF A MULTIMEDIA STREAM

TECHNICAL FIELD

The invention is in the field of telecommunications and concerns more specifically a method for equalizing the size of data packets by blocks of a multimedia stream comprising a succession of data packets of variable sizes to be transmitted in real time from a transmitter to one or more receiver(s).

This method is implemented in a system including at least one transmitter and at least one receiver exchanging in real time multimedia data packets of variable sizes, of the video, audio and/or data type, via the Internet, for example.

STATE OF THE PRIOR ART

In the field of data transmission between a source and destination, an aim which is constantly sought is to optimise bandwidth resources whilst preventing data losses due to the reception conditions.

When the purpose is to transmit a file via a unicast connection or a multicast connection, one solution consists in using systems for restoring lost packets using error-correcting codes used at the point of transmission of the packets. In practice these systems introduce redundant packets, which the receivers use so as to reconstruct any lost packets. A trivial example consists in repeating the transmitted packets by transmitting redundant copies of these packets. In practice the systems used are more sophisticated and allow improved performance in terms of restoration of lost packets for a given redundancy rate.

The ALC protocol used jointly with the FLUTE protocol provides an efficient solution to this problem based on this principle of redundant packets transporting contents determined by error-correcting codes.

When the aim is to transmit over the Internet not a file but a multimedia stream (of the audio or video type), the solutions described above are no longer directly applicable due to the high latency induced by the proposed mechanisms, which is not compatible with the transmission of multimedia content for interactive use, for example in a video-conferencing context, or indeed if real-time interaction is expected of the addressees of the stream.

In addition, the size of the packets originating from a video source encoded in real time varies greatly. This is incompatible with the use of codes in blocks, which requires fixed-size packets at input.

An additional problem relating to unicast and multicast transmissions results from the fact that it is difficult to adapt the transmitter to the conditions of the receiver since, in practice, there are always in the multicast group receivers where the reception conditions do not allow a stream containing all the transmitted packets to be received. For these receivers the packet losses then result in a deterioration of service quality, or even in a complete blockage of the service (for example, interruption of audio/video rendering).

Furthermore, when a high transmission latency can be accepted, it is possible to transmit multimedia contents which have previously been stored in the form of files, by using the ALC (Asynchronous Layered Coding) and FLUTE (File Delivery over Unidirectional Transport) protocols. In this case the entire file is transmitted with latency to each receiver before it can be played on each of them. In order to guarantee maximum reliability (which is required for file transmission), these ALC/FLUTE protocols in practice rely on the use of error-correcting codes with very large block sizes. For example, with the use of Reed Solomon code with block sizes higher than 256×8 bits, or LDPC (Low-Density Parity-Check) codes, with block sizes of several thousand bits. Such block sizes lead to a high latency, due to the encoding and decoding, and are therefore inapplicable for multimedia streams having strong time constraints (for example video-conferencing applications, or audio/video streaming applications, etc.).

When such transmission latency is unacceptable, the use of error-correcting codes with short block sizes is then conceivable, but only provided the packets being input into the encoder are fixed-size (a constraint relating to the operation of the block codes). This condition is generally not met, particularly for video streams, since the video compression techniques generate streams the transmission rate of which varies greatly, and depends on the encoded video content (transmission rate peaks are observable with movements, changes of scenes, etc.). In practice the streams consist of variable size packets.

A known solution then consists in considering a set of variable-size packets, and in completing each packet, except for the longest one, with padding bytes to obtain a set of packets of identical size. Such a method is, however, very inefficient since it may introduce a high degree of wastage of the bandwidth due to the insertion of these padding bytes. This increase of the transmission rate is greater when the size of the packets within a stream varies rapidly.

The aim of the invention is to resolve the problems of the prior art described above through a method and a robust system enabling more efficient restoration of the lost packets, whilst ensuring a compromise between resistance to lost packets and the increase of the transmission rate required to this end.

ACCOUNT OF THE INVENTION

The invention recommends a method suitable for all variable-size packet streams, having real-time constraints (latency), and able to tolerate a limited loss rate.

This method includes the following steps:

In the transmitter, storing a group of N data packets in a buffer memory, where N is a predefined integer, computing the average size $T_m$ of a packet from the different sizes of the said N packets, generating a base stream including N data packets to be transmitted, where each has a size equal either to the rounded-down integer part $\lfloor T_m \rfloor$, or to the rounded-up integer part $\lceil T_m \rceil$ of the said average size, and at least one additional stream including N redundant data packets computed from the base stream packets, having the same size as the said base stream packets, and intended to enable the receivers to restore any lost packets if the loss rate is greater than a predefined threshold, transmitting the said base stream and the said additional stream(s) to the receivers, According to another characteristic of the invention, in the receivers, the method also includes the following steps:

assessing the reception conditions of the transmitted streams, configuring the said receiver to receive, either only the base stream if there is no loss of packets, or the base stream and at least one additional stream if packet loss occurs and if the loss rate is greater than a predefined threshold.

The additional stream is preferentially an FEC (Forward Error Correction) stream using a systematic error-correcting code.

In addition, the packets of the base stream and the redundant packets include a header intended to enable restoration of the N initial packets of variable sizes in the receiver.

According to a particular embodiment of the method according to the invention, the said FEC stream is generated by means of an extended Golay code.

In a particular application the said multimedia stream is transmitted in a multicast system, with at least two layers using at least two multicast groups, where a first multicast group is used for the transmission of the base stream and at least one other multicast group is used for the transmission of at least one FEC stream.

In another application the said multimedia stream is transmitted in a unicast distribution system, where the base stream and the FEC stream are transmitted to different destination ports of the receiver.

The method according to the invention is implemented in a system for equalizing the size of data packets by blocks of a multimedia stream comprising a succession of data packets of variable sizes to be transmitted in real time from a transmitter to one or more receiver(s), in which:

the transmitter includes:

means for storing a group of N data packets in a buffer memory, where N is a predefined integer, means for computing the average size Tm of a packet from the different sizes of the said N packets, means for generating a base stream including N data packets to be transmitted, where each has a size equal either to the rounded-down integer part $\lfloor Tm \rfloor$ of the said average size, or to the rounded-up integer part $\lceil Tm \rceil$ of the said average size, and at least one additional stream including N redundant data packets computed from the base stream packets, having the same size as the said base stream packets, and intended to enable the receiver to restore any lost packets, means for transmitting the said base stream and the said additional stream(s) to the receiver, and the receivers include:

means to assess the reception conditions of the streams transmitted in each receiver terminal, decision-making means enabling the said receiver to be configured to receive either only the base stream if there is no loss of packets, or the base stream and at least one additional stream if packet loss occurs and if the loss rate is greater than a predefined threshold.

The method is implemented by means of a computer program recorded on a recording medium and intended to be executed by a processing system to equalize the size of the data packets by blocks of a multimedia stream including a succession of data packets of variable sizes to be transmitted in real time from a transmitter to one or more receiver(s), where the said computer program includes:

instructions for storing a group of N data packets in a buffer memory, where N is a predefined integer, instructions for computing the average size Tm of a packet from the different sizes of the said N packets, instructions for generating a base stream including N data packets to be transmitted, where each has a size equal either to the rounded-down integer part $\lfloor Tm \rfloor$ of the said average size, or to the rounded-up integer part $\lceil Tm \rceil$ of the said average size, and at least one additional stream including N redundant data packets computed from the base stream packets, having the same size as the said base stream packets, and intended to enable the receiver to restore any lost packets if the loss rate is higher than a predefined threshold, instructions for transmitting the said base stream and the said additional stream(s) to the receiver, The computer program according to the invention also includes:

instructions to assess the reception conditions of the streams transmitted in the receivers, instructions to configure the said receivers in order to receive either only the base stream if there is no loss of packets, or the base stream and at least one additional stream if packet loss occurs and if the loss rate is greater than a predefined threshold.

BRIEF DESCRIPTION OF THE ILLUSTRATIONS

Other characteristics and advantages of the invention will become clear from the following description, which is given as a non-restrictive example, with reference to the appended figures, in which.

DETAILED ACCOUNT OF PARTICULAR EMBODIMENTS

The invention will be described in an example of transmission of a multicast stream using the UDP (User Datagram Protocol) protocol. This stream is broadcast via the Internet by a transmitter with multiple receivers able to connect with a multicast network. For the sake of clarity of the description, the system illustrated by FIG. 1 includes a single transmitter 2 and a single receiver 4 exchanging multimedia streams via a multicast network 5.

Figure 1:
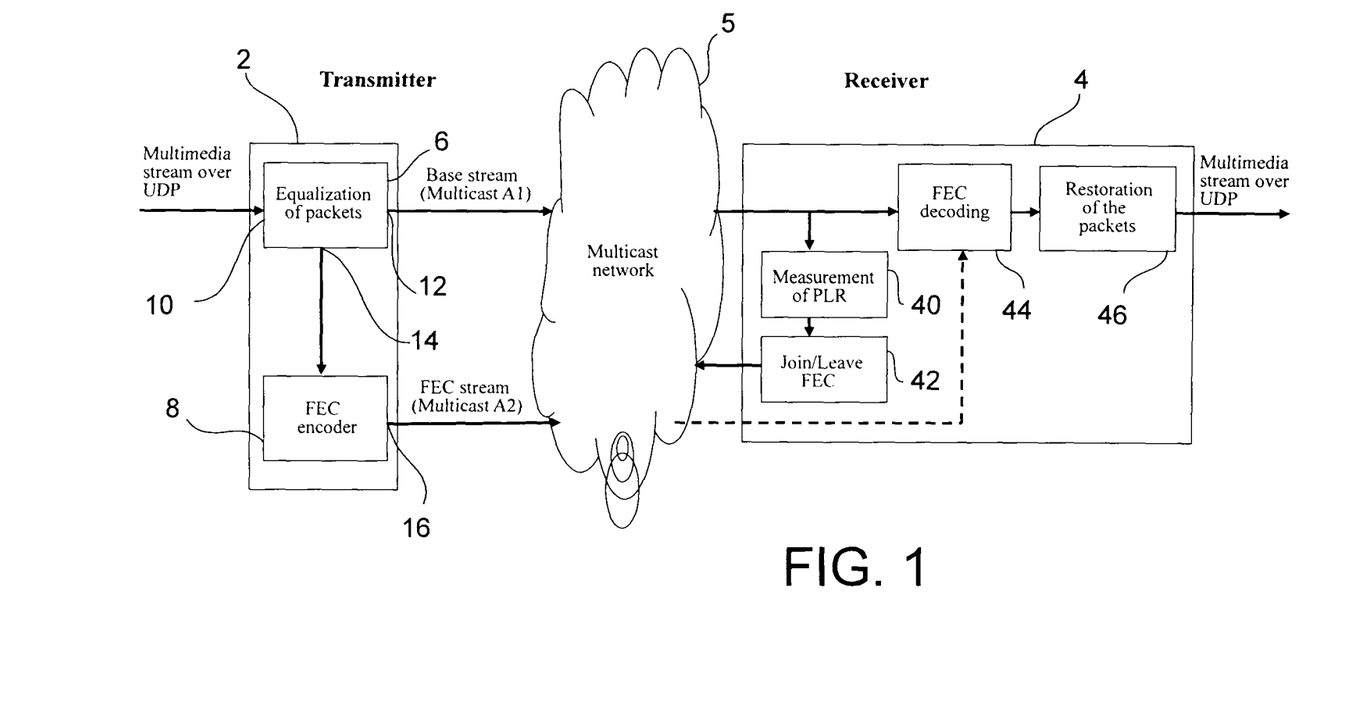
FIG. 1 illustrates schematically an example of a system for equalizing the size of the data packets by blocks according to the invention.

With reference to FIG. 1, transmitter 2 includes a module for equalizing the packets 6 and an FEC (Forward Error Correction) encoder 8. Packet equalization module 6 includes an input 10 which receives a multimedia stream originating for example from a video encoder consisting of a succession of UDP (User Datagram Protocol) packets, the sizes of which in bytes varies, where a first output 12 intended to deliver a base stream to multicast network 5 includes equalized data packets, and a second output 14 intended to deliver to FEC encoder 8 FEC packets of the same sizes as the data packets of the base stream.

Packet equalization module 6 also includes a buffer memory, unrepresented, intended to store a predefined number N of packets received. An application module implemented in packet equalization module 6 computes the average size Tm of a packet from the different sizes of the N stored packets, and generates a base stream including N data packets, each being of a size equal either to the rounded-down integer part $\lfloor Tm \rfloor$ or to the rounded-up integer part $\rceil Tm\rceil$ of the computed average size.

It should be noted that the size of the output packets is not rigorously equal to the said average size Tm since, firstly, depending on the nature of the input stream, the total number of bytes contained in the N received packets is not necessarily a multiple of N and, moreover, packet-equalization module 6 is configured to add a header consisting of several bytes (for example three) to the transmitted packets in order to allow restoration of the N variable-size initial packets on the receiver side.

Receiver 4 includes a module 44 measuring the packet loss rate, a multiplexer 42 intended to control reception of the FEC packets associated with the base data packets in the event of packet losses, a decoder 44 of FEC packets, and a module 46 for restoring the original variable-size packets.

In operation, transmitter 2 transmits the equalized packets via output 12, completed by their headers, to a first multicast group, while FEC encoder 8 transmits the FEC packets via an output 16 to another multicast group.

Figure 2:
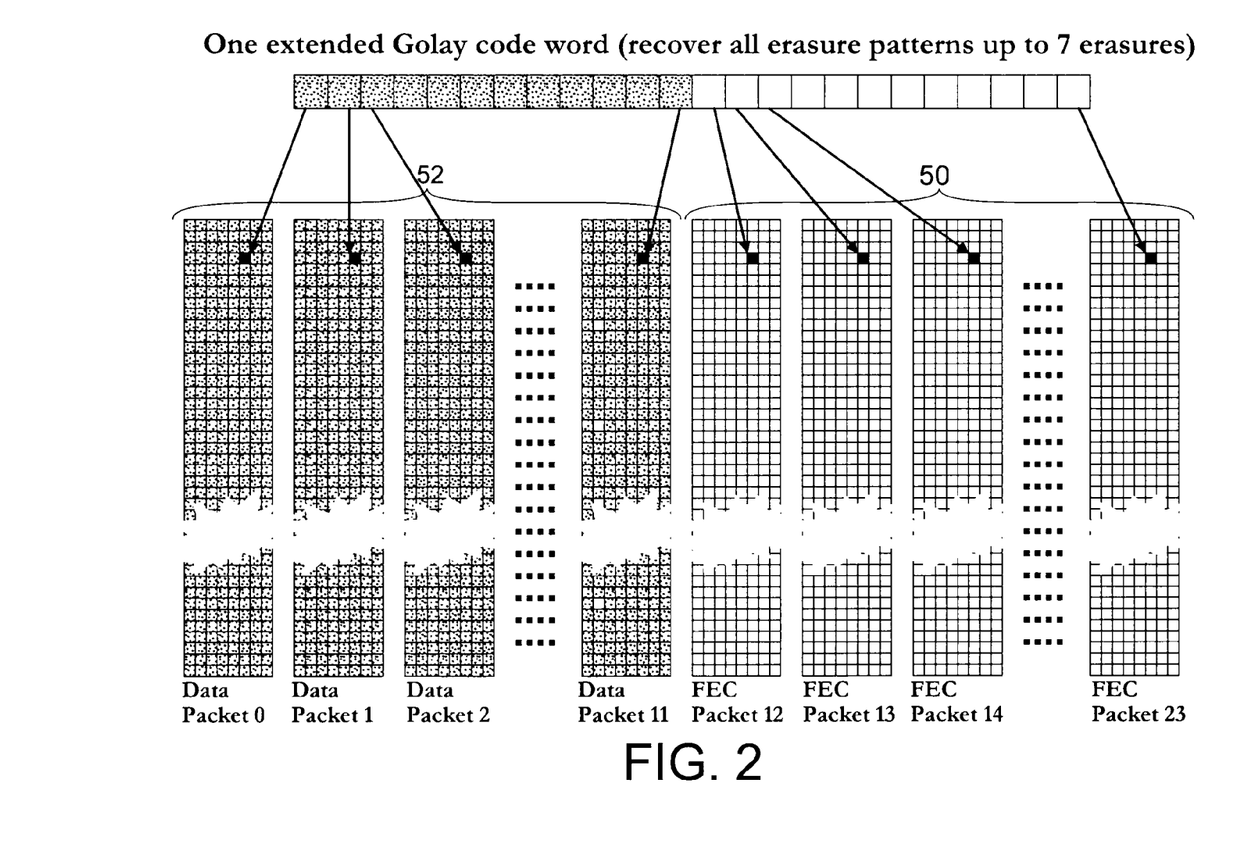
FIG. 2 illustrates schematically an example of a method of construction of redundant packets from base stream packets implemented using the set of Golay code words.

FIG. 2 illustrates schematically the construction of twelve redundant FEC packets 50 from twelve base stream packets 52 using the set of extended Golay code words.

It should be recalled that the set of words of this code comprises 4096 words of 24 bits, and that one word of the code differs from every other word by at least 8 bits. This code is systematic in the sense that there is one and only one word for a set of 12 bits chosen arbitrarily in the first 12 positions.

In the example illustrated by FIG. 2, the first twelve positions are used to convey data relative to a base stream, and the final twelve positions are used to convey data relative to an FEC stream.

Thus, if a receiver receives a subset of these 24 packets from which up to 7 packets are missing, it will be able to reconstruct the lost packets bit-by-bit, using the fact that two words of the Golay code differ by at least eight positions.

Figure 3:
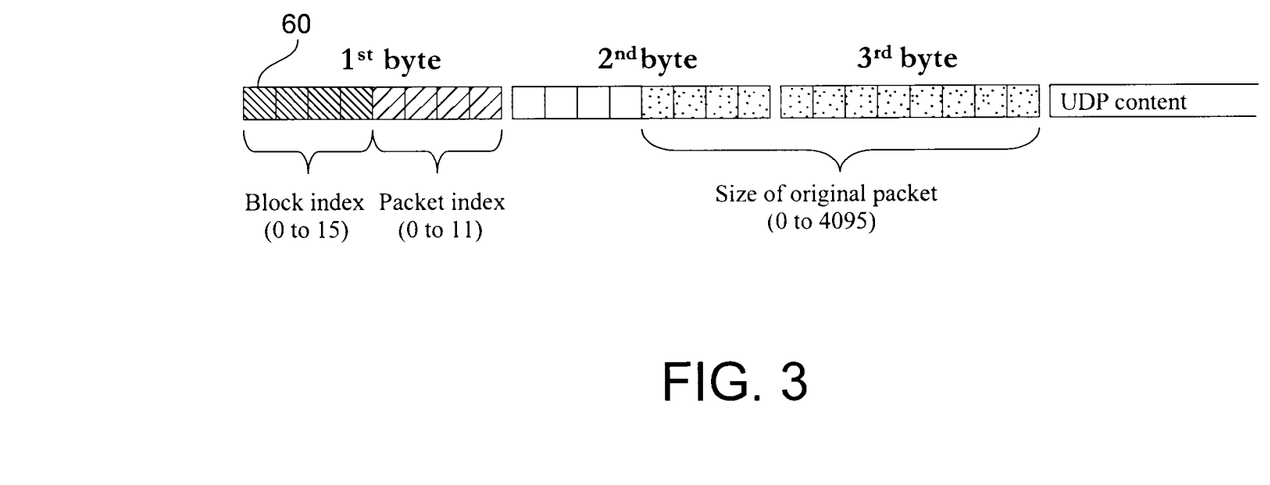
FIG. 3 represents schematically an example of a header associated with the data packets equalized by the method according to the invention allowing the lost packets to be restored.

FIG. 3 presents an example of a three-byte header enabling lost packet reconstruction to be implemented. This header is added by packet-equalization module 6.

First byte 60 contains a block index and the index of the packet intended to enable decoder 44 to group together the packets of a given block. This is particular useful since the order of the received packets is not guaranteed after they have transmitted over the network.

The second and the third bytes contain the size in bytes of the original packet corresponding to the packet index contained in the first byte.

In addition to allowing equalization and restoration of the initial packets of the multimedia stream, this header is also used to detect packet losses by means, for example, of the block and packet indices, even in the presence of jitter. Both these indices enable receiver 4 to determine the most recently transmitted packet from among all the received packets, and thus to detect every older packet which has still not been received. When the period between an unreceived packet and the most recently transmitted packet of the received packets exceeds a certain threshold, then the received packet cannot be considered to be lost.

Packet losses can thus be measured in the receiver by packet-loss rate-measuring module 40, in order to control activation of the packet-loss correction mechanism dynamically. If the measured packet-loss rate is greater than a predetermined threshold, receiver 4 automatically activates reception of the FEC stream and decoding of this FEC stream.

Figure 4:
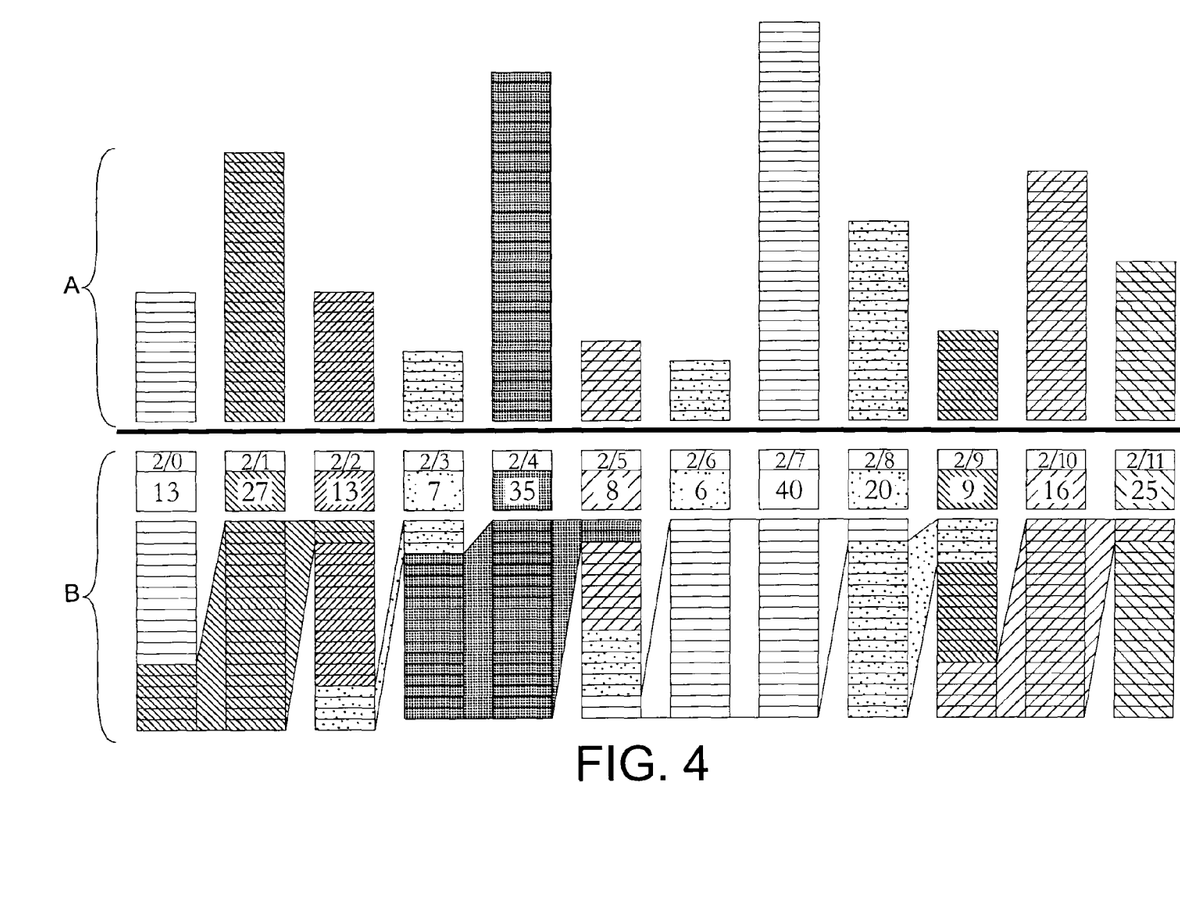
FIG. 4 illustrates graphically equalization of data packets by the method according to the invention.

FIG. 4 presents in graphical form the packet-equalization principle. In the upper part A twelve packets of unequal sizes are represented, and in the lower part B the twelve packets are represented after equalization.

In the lower part B the three-byte header consisting of a byte including the index of the block, presumed to be equal to 2 in the example of FIG. 4, is also represented, together with the equalizer packet index varying from 0 to 11.

The input bytes are stored in this matrix in top-to-bottom and left-to-right order. It should be noted that since the total number of input bytes is not divisible by 12 that the size of the packets can differ by one byte. In the example of FIG. 4, since the remainder of the division by 12 is equal to 3, the first three equalized packets consequently include an additional byte. This slight difference in relation to the size of the packets (up to a maximum of one byte) poses no problems for the implementation of the FEC since it is possible to apply the "padding" technique to equalize the sizes of all the packets of the block to that of the first equalized block by adding, for example, a zero-byte to blocks 3 to 11. It is also possible not to transmit this padding byte if the decoder and the encoder are configured to consider that untransmitted bytes have a value equal to zero.

In operation, restoration of the original packets in the decoder occurs by reading the packets from top to bottom and from left to right in the received matrix, represented in the lower part B of FIG. 4.

In the example of this FIG. 4, packet equalizer 14 reads, for example, 13 bytes in the first column of the table in order to reconstruct the first packet, followed by 27 bytes starting from the current position in the first column, which leads to the reading of the third column, etc. This reading takes account of the 1-byte size difference between the first three columns (packet index 0 to 2), in the case of this example, and the other columns (packet index 3 to 11).

Figure 5:
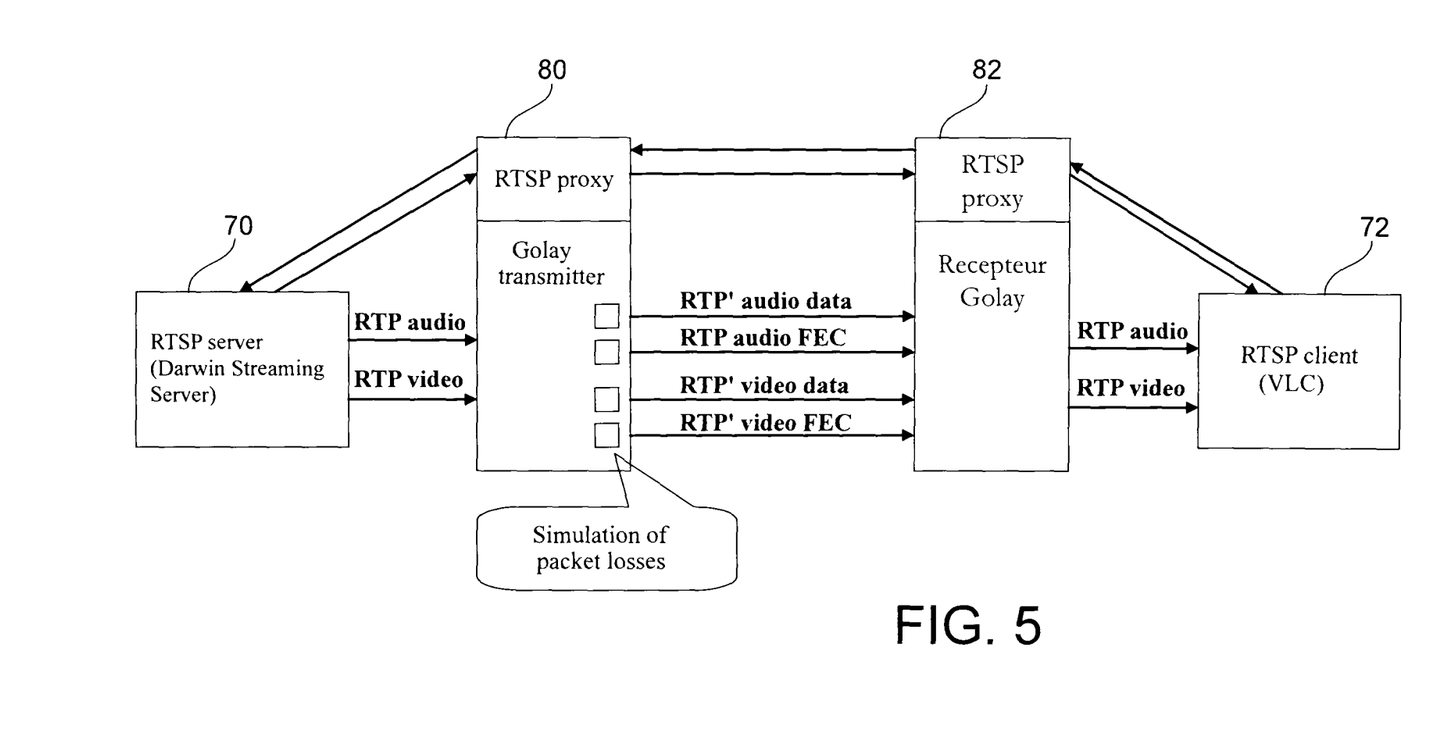
FIG. 5 illustrates schematically an example of a software architecture to implement a simulation of the method according to the invention.

FIG. 5 represents an application architecture to implement a simulation of the method according to the invention including an RTSP 70 (Real Time Streaming Protocol) server and an RTSP 72 client. The RTSP 70 server uses the open-source server of Apple® Darwin Streaming Server® and the RTSP 72 client uses an RTSP VLC (VideoLan Player) video player. A multimedia session is then initialised using the RTSP protocol.

The architecture of FIG. 5 also includes a first proxy server 80 (or proxy RTSP) and a second proxy server 82, used to intercept the RTSP messages and to substitute the appropriate data elements in order to insert the Golay transmitter and receiver in the path of the multimedia streams.

Figure 6:
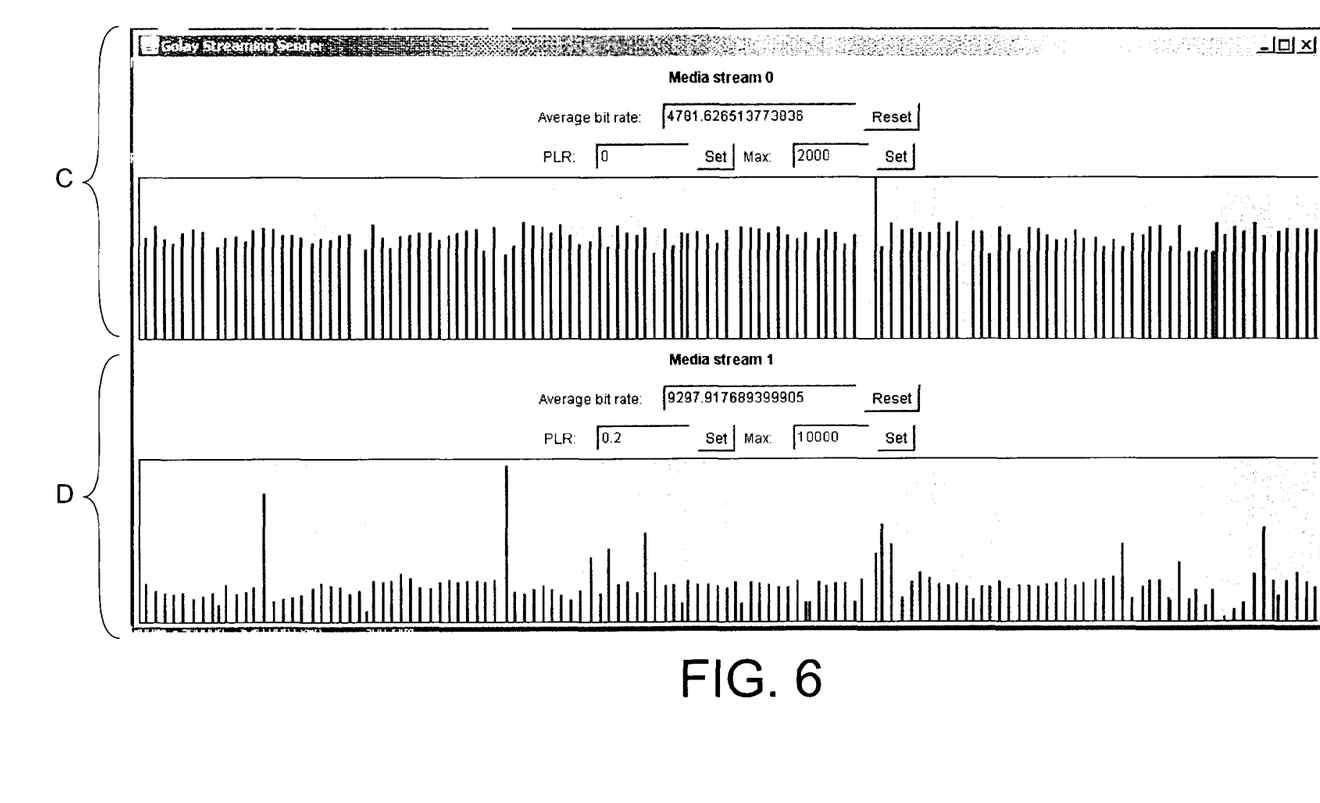
FIG. 6 represents the graphical interface of the application module used in the method according to the invention in the transmitter.

FIG. 6 represents the graphical interface of the application module used for the transmission, notably illustrating the variable character of the size of the packets originating from a real-time video encoder.

The packets originating from the audio encoder are represented in the upper part C of FIG. 6, and the packets originating from the video encoder are represented in the lower part D of FIG. 6.

Each vertical line stands for a transmitted packet, and the height of this line represents the size of the packet. In the case of the video flow a phenomenon of groups of packets transmitted in a very short time interval is observed, each group corresponding to the encoding of an image. These groups of packets are represented by alternating black and grey lines in FIG. 6. It can be seen that each group of packets is transmitted at a regular transmission rate which is equal to the transmission rate of the video stream images.

The graphical interface also enables the user to simulate packet losses in the network, in the transmitter. A Packet Loss Ratio (PLR) can be simulated in the transmitter by decimating the transmitted packet stream on a random basis.

Figure 7:
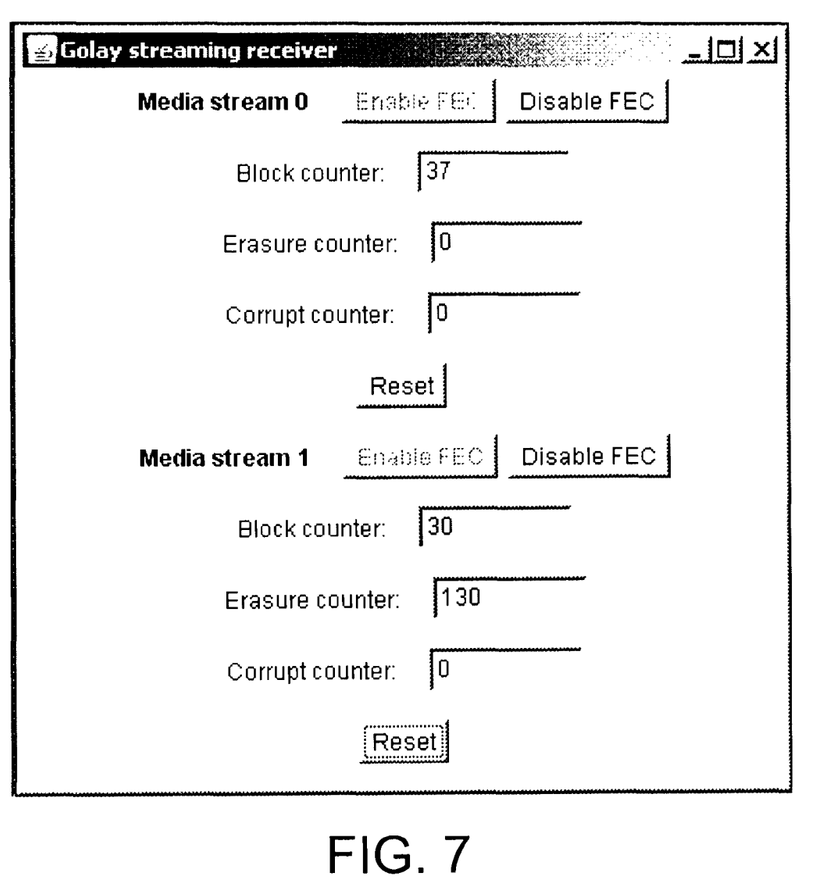
FIG. 7 represents the graphical interface of the application module used in the method according to the invention in the receiver.

FIG. 7 represents the graphical interface of the receiver including buttons (Enable FEC, Disable FEC) respectively to activate or deactivate the lost packet recovery mechanism. The interface also includes a block counter, a counter of unreceived packets, and a counter of corrupted packets.

Figure 8:
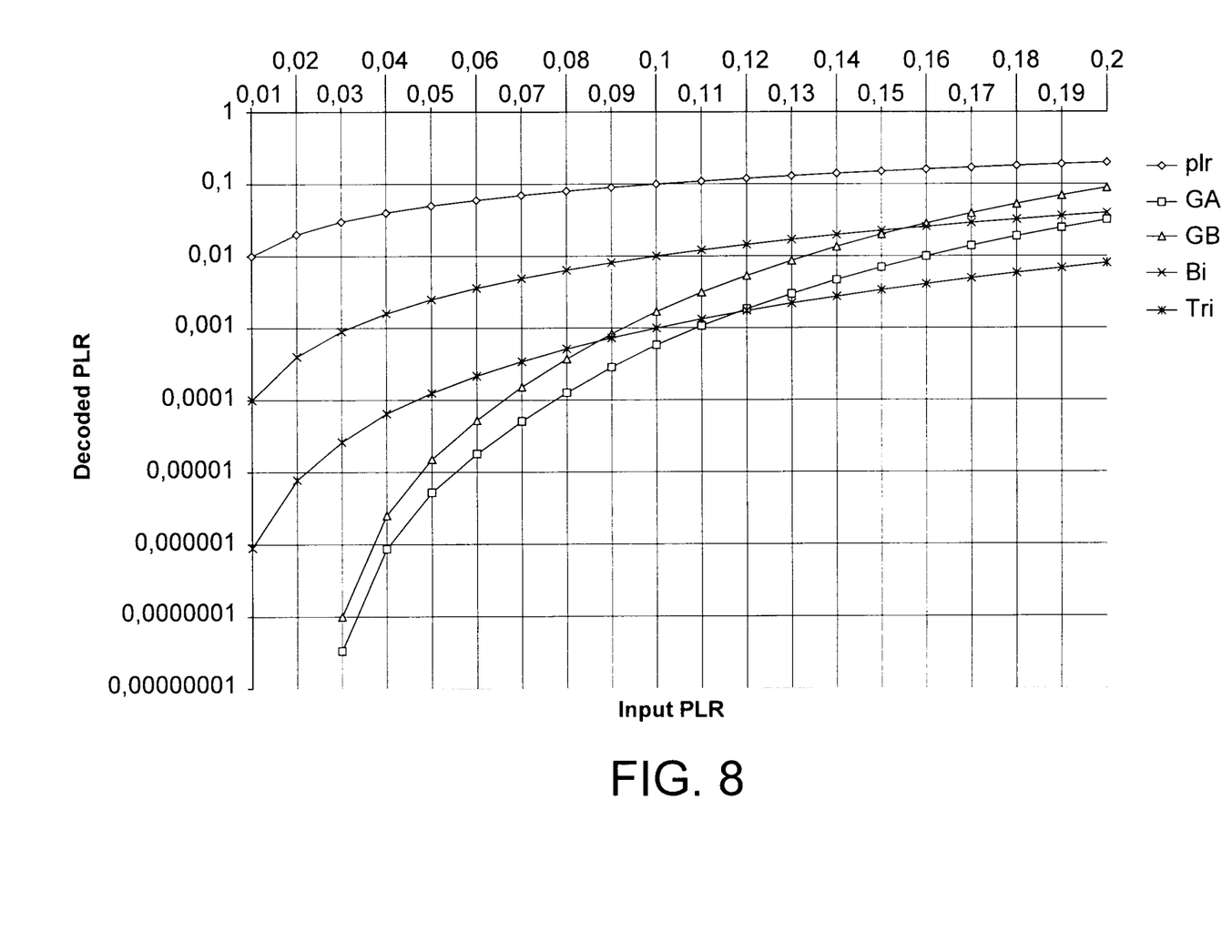
FIG. 8 presents simulation results in the case of the use of an extended Golay code.

FIG. 8 presents simulation results in the case of the use of an extended Golay code.

In this figure, the packet loss rate in the channel is represented by the abscissa, and the residual packet loss rate is represented with a logarithmic scale in the ordinate axis, after implementation of the lost packet recovery mechanism.

The "plr" graph is the identity graph, i.e. the one where there is no activation of the recovery mechanism.

The "bi" graph is obtained following the transmission of a redundant copy of each transmitted packet, i.e. with the hypothesis of a duplication of the bandwidth.

The "tri" graph is obtained following the transmission of two redundant copies of each transmitted packet, i.e. with the hypothesis of a tripling of the bandwidth.

These graphs are produced with an assumption that the receiver can receive equally well the original packet or one of its redundant copies.

The "GA" graph is the graph produced by supposing the use of a Golay code, and supposing that when a block of received packets cannot be recovered completely due to the missing packets the other packets of the block are still usable.

In practice the packet-equalization system used can cause an inability to restore the original packets for the entire block, if not all packets of the block can be restored. There is therefore a phenomenon of amplification which is represented by the "GB" graph, which is produced on the assumption that, if there is at least one irrecoverable packet in the block then all the packets of the block are lost.

It appears that the "GA" graph exceeds the "bi" graph in terms of performance for all packet loss rates.

It should be noted that only the "bi" graph is directly comparable, since it causes the same bandwidth duplication factor as that of the extended Golay code.

If the "GA" graph is compared with the "tri" code, it can be seen that the performance of the Golay code is still better if the packet error rate remains less than 0.12.

If the "GB" graph is considered, it can be seen that it gives better results than the "bi" graph for packet loss rates of less than 0.16, and better results than the "tri" graph for packet loss rates of less than 0.09.

The proposed invention enables tolerance to packet losses of any multimedia stream to be improved significantly, thus providing increased robustness in addressing congestion phenomena which may arise in the network, and also in addressing packet losses relating to poor quality of the radio link.

The proposed invention is particularly suitable for all variable-size packet streams, having real-time constraints (latency), and able to tolerate a limited loss rate. Among others, video streaming applications (for example, IPTV), audio streaming applications (for example, music broadcasting), or again all interactive streaming applications (for example, videoconferencing, online multi-player games, etc.) may be mentioned.

The invention is also applicable to the whole family of block codes, and in particular those having a short block size. Although applicable in the case of unicast transmission, the full value of the invention is seen in the context of multicast transmissions, in which traditional techniques to improve reliability (based on acknowledgement and retransmission) are not conceivable.

The invention also allows efficient use of the bandwidth by giving the receiver the possibility of detecting packet losses, and activating FEC support only when this is required.

The invention claimed is:

1. A method for equalizing a size of data packets by blocks of a multimedia stream including a succession of data packets of variable sizes to be transmitted in real time from a transmitter to one or more receivers, the method comprising:
   in the transmitter:
      storing a group of N data packets in a buffer memory, where N is a predefined integer;
      computing the average size of a packet from the different sizes of the N packets;
      generating a base stream including N data packets to be transmitted, wherein each has a size equal either to the rounded-down integer part, or to the rounded-up integer part of the average size, and at least one additional stream including N redundant data packets computed from the base stream packets, having a same size as the base stream packets, and intended to enable the receivers to restore any lost packets if the loss rate is greater than a predefined threshold;
      assessing reception conditions of the transmitted streams;
      transmitting to the receivers, either only the base stream if there is no loss of packets, or the base stream and at least one additional stream if packet loss occurs and if the loss rate is greater than a predefined threshold, a method in which the multimedia stream is transmitted in a multicast system with at least two layers using at least two multicast groups, wherein a first multicast group is used for transmission of the base stream and at least one other multicast group is used for transmission of at least one FEC stream; and
   in the receivers:
      configuring the receivers to receive either only the base stream if there is no packet loss, or the base stream and at least one additional stream if packet loss occurs and if the loss rate is greater than the predefined threshold.

2. A method according to claim 1, in which the additional stream uses an FEC (Forward Error Correction) device with systematic error correcting code.

3. A method according to claim 1, in which the packets of the base stream and the redundant packets include a header intended to enable the N initial packets of variable sizes to be restored in the receivers.

4. A method according to claim 2, in which the FEC stream is generated using an extended Golay code.

5. A transmitter of a multimedia stream including a succession of data packets of variable sizes, comprising:
   a buffer memory that stores a group of N data packets, where N is a predefined integer;
   circuitry configured to
   compute the average size of a packet from the different sizes of the N packets;
   generate a base stream including N data packets to be transmitted, wherein each has a size equal either to the rounded-down integer part of the average size, or to the rounded-up integer part of the average size, and at least one additional stream including N redundant data packets computed from the base stream packets, having a same size as the base stream packets, wherein the redundant packets are intended to enable a receiver to restore any lost packets if the loss rate is higher than a predefined threshold;
assess the reception conditions of the transmitted streams; measure the loss rate of the packets; and
activate transmission of at least one additional stream if the loss rate is greater than the predefined threshold, to make use of the lost packet restoration mechanism, wherein the multimedia stream is transmitted in a multicast system with at least two layers using at least two multicast groups, wherein a first multicast group is used for transmission of the base stream and at least one other multicast group is used for transmission of at least one FEC stream.

6. A receiver of a multimedia stream including a succession of data packets of variable sizes transmitted by a transmitter according to claim 5, comprising:
circuitry configured to
assess the reception conditions of the transmitted streams; and
enable the receiver to be configured to receive, either only the base stream if there is no packet loss, or the base stream and at least one additional stream in event of packet loss and if the loss rate is greater than the predefined threshold, wherein the multimedia stream is transmitted in a multicast system with at least two layers using at least two multicast groups, wherein a first multicast group is used for transmission of the base stream and at least one other multicast group is used for transmission of at least one FEC stream.

7. A system for equalizing sizes of the data packets by blocks of a multimedia stream including a succession of data packets of variable sizes to be transmitted in real time, comprising:
a transmitter according to claim 5 and a receiver.

8. A non-transitory computer readable recording medium including computer executable instructions intended to be executed by a processing system to equalize a size of data packets by blocks of a multimedia stream including a succession of data packets of variable sizes to be transmitted in real time from a transmitter according to claim 5 to one or more receiver(s) comprising:
instructions for storing a group of N data packets in a buffer memory, where N is a predefined integer;
instructions for computing the average size of a packet from the different sizes of the N packets;
instructions for generating a base stream including N data packets to be transmitted, wherein each has a size equal either to the rounded-down integer part of the average size, or to the rounded-up integer part of the average size, and at least one additional stream including N redundant data packets computed from the base stream packets, having a same size as the base stream packets, and intended to enable the receivers to restore any lost packets if the loss rate is higher than a predefined threshold;
instructions to assess reception conditions of the streams transmitted in the receiver;
instructions to transmit to the receiver, either only the base stream if there is no loss of packets, or the base stream and at least one additional stream if packet loss occurs and if the loss rate is greater than the predefined threshold, wherein the multimedia stream is transmitted in a multicast system with at least two layers using at least two multicast groups, wherein a first multicast group is used for transmission of the base stream and at least one other multicast group is used for transmission of at least one FEC stream.

* * * * *